Patented Nov. 16, 1948

2,453,779

UNITED STATES PATENT OFFICE 2,453,779

PREPARATION OF ALKYL HALIDES

Donald C. Bond, Northbrook, and Michael Savoy, Chicago, Ill., assignors to The Pure Oil Company, Chicago, Ill., a corporation of Ohio No Drawing. Application November 1, 1944, Serial No. 561,487

15 Claims. (Cl. 260—663)

This invention relates to the preparation of alkyl halides by reaction of olefins or olefin-containing gases with hydrogen halides in the presence of thorium salts.

We have discovered that thorium salts, particularly the halides and oxyhalides of thorium, catalyze the reaction of olefins and hydrogen halides to alkyl halides and that the catalyst maintains its activity over long periods of time as contrasted to the Friedel-Crafts type of catalysts which become spent fairly rapidly in alkyl halide synthesis.

The object of the invention is to provide an improved method for synthesizing alkyl halides.

Another object of the invention is to provide an improved method for synthesizing alkyl chlorides from olefins and hydrogen chloride.

Still another object of the invention is to provide an improved method for synthesizing ethyl chloride from ethylene or ethylene-containing gases and hydrogen chloride.

The process is carried out by contacting a mixture of olefin or olefin-containing gases, such as gases obtained in the cracking of hydrocarbon oils, and hydrogen halide with a thorium salt at temperatures of approximately 200 to 750° F. and at atmospheric or super-atmospheric pressure. In the synthesis of ethyl chloride, temperature of reaction is preferably between approximately 350 to 500° F. when the reaction is carried out at atmospheric pressure. At temperatures above 500° F. disassociation of ethyl chloride occurs to a marked extent unless the ethyl chloride is maintained under super-atmospheric pressure. The higher the pressure, the less the disassociation of the ethyl chloride; therefore, at super-atmospheric pressures, temperatures of above 500° F. may be used in carrying out the reaction.

In the synthesis of alkyl halides of the higher molecular weight olefins, such as propylene and butylene, lower temperatures may be used than are used in the preparation of ethyl halide since the higher molecular weight halides react more readily at lower temperatures than does ethylene. Temperatures between 200 and 350° F. are satisfactory in the synthesis of the halides of propylene and butylene.

The process may be carried out by passing the reactants through a bed of catalyst preferably supported on a solid, porous carrier such as activated charcoal, activated alumina, silica gel, natural clay catalysts, such as fuller's earth, or synthetic silica-alumina catalysts, such as are used in the cracking of hydrocarbon oils; or the catalyst in finely divided or powdered form may be suspended in the stream of reactants passing through the reaction zone and afterwards separated from the reaction products.

Another method of carrying out the process is to suspend the catalyst in an inert liquid such as nitrobenzene which has a boiling point above the boiling point of the reactants and which does not boil under reaction conditions, and pass the gaseous reactants through the body of liquid containing the suspended catalyst.

Reaction between the hydrogen halide and the olefin takes place rapidly in the presence of the thorium salt, so that as a result short contact times may be used. Contact time between catalyst and the reactants may range from a few seconds to several hours depending upon the nature of the operation carried out. In batch operation where it is desired to obtain the highest yield of reaction products possible, long contact times may be used. In continuous operation shorter contact times are preferably used, particularly where recycling of unreacted portions of the effluent is practiced.

Where the source of olefin is a gas containing a relatively small amount of olefin, such as refinery gas, so that it is not advisable to recycle effluent gas because it dilutes the fresh charge, it may be preferable to use an amount of hydrogen halide in excess of the amount which is necessary to stoichiometrically react with the olefin in the charging gas and thereby cause a large amount of olefin content of the charging gas to react to form alkyl halides, thus reducing the olefin content of the effluent to a point where it can be discarded. Excess hydrogen halide in the effluent can be recovered by water-washing and distillation or by other suitable method and recycled.

Where the olefin charged to the reaction is substantially pure olefin, the ratio between olefin and hydrogen halide may be stoichiometric or olefins may be charged in excess of the stoichiometric ratio in order to completely consume the hydrogen chloride and avoid necessity of recovering it. Where an excess of olefin is used, the olefin can be readily separated from reaction products and recycled to the process.

In order to demonstrate the invention, a catalyst was prepared by dissolving in water 149 grams of thorium nitrate, containing four molecules of water per molecule of thorium nitrate. Concentrated ammonium hydroxide was added to the solution until the precipitation of the thorium hydroxide was completed. The precipitate was filtered off, washed with four liters of water and re-dissolved in concentrated hydrochloric acid. The thorium hydroxide was again re-precipitated with ammonium hydroxide, filtered and washed with water and re-dissolved in concentrated hydrochloric acid. To the solution thus prepared was added 400 cc. of active charcoal and the water was evaporated off in the presence of hydrogen chloride. The resulting catalyst was dried by heating it to 400° F. for two hours in the presence of hydrogen chloride.

A steel reaction tube of approximately 1.5 inches inside diameter and 14 inches in length having a volume of approximately 375 cc. was filled with the catalyst prepared as above described. The reactor was heated to and maintained at a temperature of 385° F. while ethylene at the rate of 0.2 cubic foot per hour, and anhydrous hydrogen chloride at the rate of 0.2 cubic foot per hour, both measured at standard temperature and pressure, were passed through the reactor. After ten hours running, 49.8% of the ethylene and 48.5% of the hydrogen chloride passed through the reactor had been converted to ethyl chloride.

Under similar conditions, active charcoal alone will convert less than 5% of the ethylene and the hydrogen chloride to ethyl chloride.

Although we prefer to use thorium oxychloride and thorium chloride or mixtures thereof as catalysts and to prepare the catalyst by impregnating a carrier with a solution of thorium chloride followed by drying, other thorium salts such as sulfates, nitrates and phosphates may be used as catalysts either alone or on carriers with good results. Exceptionally high yields of alkyl halides, particularly ethyl chloride, can be obtained by using a catalyst prepared by impregnating silica gel with a thorium salt solution and drying, particularly thorium chloride or oxychloride.

Contact time between the reactants and catalyst may range from a few seconds to several hours. Where the process is continuous, contact times of approximately 1 to 10 minutes give good yields. In batch type operation reaction may be allowed to continue until the reaction mixture reaches equilibrium.

It will be seen, therefore, that we have developed a process for synthesizing alkyl halides in the presence of catalysts which not only have a high activity, but which do not become rapidly spent during use.

We claim:

1. The method of preparing alkyl halides comprising contacting a mixture of an olefin and hydrogen halide with a thorium salt at a temperature at which the olefin and hydrogen halide combine.

2. Method in accordance with claim 1 in which the temperature is approximately 200 to 750° F.

3. Method in accordance with claim 1 in which the thorium salt is thorium chloride.

4. Method in accordance with claim 1 in which the thorium salt is thorium oxychloride.

5. The method of preparing alkyl chlorides comprising contacting a mixture of an olefin and anhydrous hydrogen chloride with a catalyst comprising a thorium salt at temperatures of approximately 200 to 750° F.

6. Method in accordance with claim 5 in which the catalyst is thorium chloride.

7. Method in accordance with claim 5 in which the catalyst is thorium oxychloride.

8. Method in accordance with claim 5 in which the catalyst is prepared by impregnating a solid, porous carrier with a solution of thorium chloride and drying the mixture.

9. Method in accordance with claim 5 in which the catalyst is silica gel impregnated with a thorium salt.

10. Method in accordance with claim 5 in which the catalyst is prepared by impregnating silica gel with a solution of thorium chloride and drying the resulting mixture.

11. The method of preparing ethyl chloride comprising contacting a mixture of an ethylene-containing gas and anhydrous hydrogen chloride with a catalyst comprising a thorium salt at a temperature of approximately 350 to 750° F.

12. Method in accordance with claim 11 in which the temperature is approximately 350–500° F.

13. Method in accordance with claim 11 in which the catalyst is prepared by impregnating a solid, porous carrier with a solution of thorium chloride and drying the resulting mixture.

14. Method in accordance with claim 11 in which the catalyst is silica gel with thorium chloride.

15. Method in accordance with claim 11 in which the catalyst is silica gel impregnated with thorium oxychloride.

DONALD C. BOND.
MICHAEL SAVOY.

REFERENCES CITED

The following references are of record in the file of this patent:

UNITED STATES PATENTS

| Number | Name | Date |
|---|---|---|
| 2,094,064 | Flemming | Sept. 28, 1937 |
| 2,103,692 | Piotrowski et al. | Dec. 28, 1937 |
| 2,328,275 | Heard | Aug. 31, 1943 |

FOREIGN PATENTS

| Number | Country | Date |
|---|---|---|
| 435,858 | Great Britain | Oct. 1, 1935 |
| 701,401 | Germany | Jan. 15, 1941 |